(12) United States Patent
Caminada et al.

(10) Patent No.: US 12,162,595 B2
(45) Date of Patent: Dec. 10, 2024

(54) TENSION TORSION STRAP OF A ROTOR HEAD OF A ROTARY WING AIRCRAFT

(71) Applicant: Kopter Group AG, Mollis (CH)

(72) Inventors: Mario Caminada, Ernetschwil (CH); Michal Skrzynski, Zürich (CH)

(73) Assignee: Kopter Group AG (CH)

( * ) Notice: Subject to any disclaimer, the term of this patent is extended or adjusted under 35 U.S.C. 154(b) by 49 days.

(21) Appl. No.: 17/923,576

(22) PCT Filed: Apr. 23, 2021

(86) PCT No.: PCT/EP2021/060689
§ 371 (c)(1),
(2) Date: Nov. 5, 2022

(87) PCT Pub. No.: WO2021/224034
PCT Pub. Date: Nov. 11, 2021

(65) Prior Publication Data
US 2023/0166836 A1 Jun. 1, 2023

(30) Foreign Application Priority Data
May 6, 2020 (CH) ..................................... 00539/20

(51) Int. Cl.
*B64C 27/33* (2006.01)
*B64C 27/48* (2006.01)

(52) U.S. Cl.
CPC .............. *B64C 27/33* (2013.01); *B64C 27/48* (2013.01)

(58) Field of Classification Search
CPC .................................. B64C 27/33; B64C 27/48
See application file for complete search history.

(56) References Cited

U.S. PATENT DOCUMENTS 3,370,483 A * 2/1968 Ditlinger ............... B64C 27/327
416/135
4,648,800 A * 3/1987 Fradenburgh ........... B64C 27/33
416/134 A (Continued)

FOREIGN PATENT DOCUMENTS

EP    2783981 A1    10/2014
EP    2949579 A1    2/2015

(Continued)

OTHER PUBLICATIONS

English language machine translation of KR100651617B1 as provided by Espacenet of the European Patent Office.

(Continued)

*Primary Examiner* — Eldon T Brockman
(74) *Attorney, Agent, or Firm* — Lerner David LLP

(57) ABSTRACT

This disclosure describes a tension torsion strap for part of rotor head of a rotary wing aircraft. The tension torsion strap includes, in a direction of a longitudinal axis, a first peripheral area with a connection eye, a central section, and a second peripheral area with a connection eye. The tension torsion strap may be of one-piece made of a multiplicity of joined layers. Improved production and installation is of the tension torsion strap may be achieved by that disclosed in this disclosure, resulting in, among other advantages, more simplified maintenance because the tension torsion strap has an overall asymmetric shape relatively to a transverse axis due to two unequally shaped peripheral areas which cannot be brought into alignment when folding around the transverse axis.

19 Claims, 4 Drawing Sheets

(56) References Cited

U.S. PATENT DOCUMENTS

| | | | | |
|---|---|---|---|---|
| 5,372,479 A | * | 12/1994 | Byrnes | B64C 27/33 416/134 A |
| 5,431,538 A | * | 7/1995 | Schmaling | B64C 27/33 416/134 A |
| 5,690,474 A | * | 11/1997 | Byrnes | B64C 27/33 416/134 A |
| 5,759,325 A | * | 6/1998 | Davis | B29C 33/30 156/154 |
| 2010/0278648 A1 | * | 11/2010 | Kuntze-Fechner | B29C 70/545 416/134 A |
| 2023/0166836 A1 | * | 6/2023 | Caminada | B64C 27/33 416/135 |

FOREIGN PATENT DOCUMENTS

| | | |
|---|---|---|
| EP | 2883790 A1 | 6/2015 |
| EP | 2979579 A1 | 2/2016 |
| EP | 3315403 A1 | 5/2018 |
| EP | 3643609 A1 | 4/2020 |
| FR | 1551946 A | 11/1968 |
| JP | H11506065 A | 6/1999 |
| KR | 10-0821617 B1 | 10/2006 |
| KR | 100651617 B1 | 11/2006 |
| WO | WO96/39327 | 12/1996 |
| WO | WO2016/201079 | 12/2016 |

OTHER PUBLICATIONS

English language machine translation of FR1551946A as provided by Espacenet of the European Patent Office.
English language machine translation of EP3643609A1 as provided by Espacenet of the European Patent Office.
English language machine translation of EP3315403A1 as provided by Espacenet of the European Patent Office.
International Search Report for PCT/EP2021/060689.
Japanese office action of Dec. 13, 2023 in Japanese Patent Application No. 2022-567122.

* cited by examiner

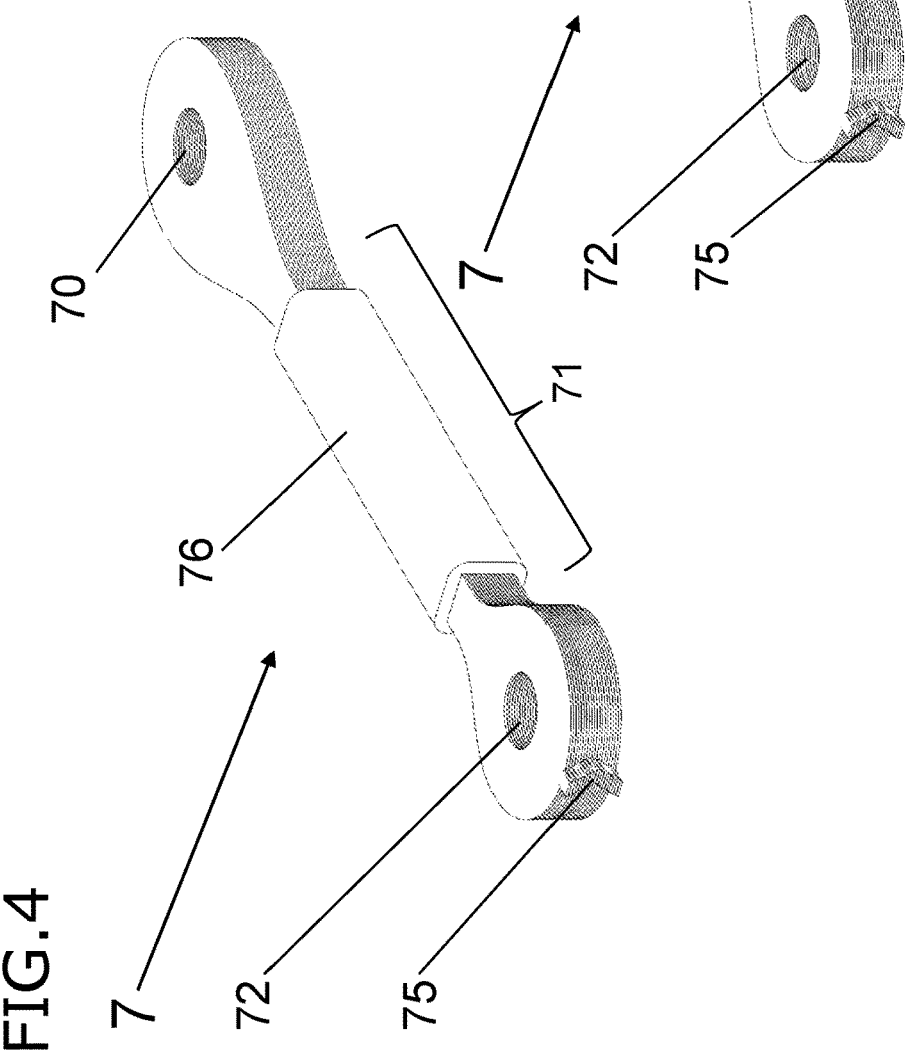
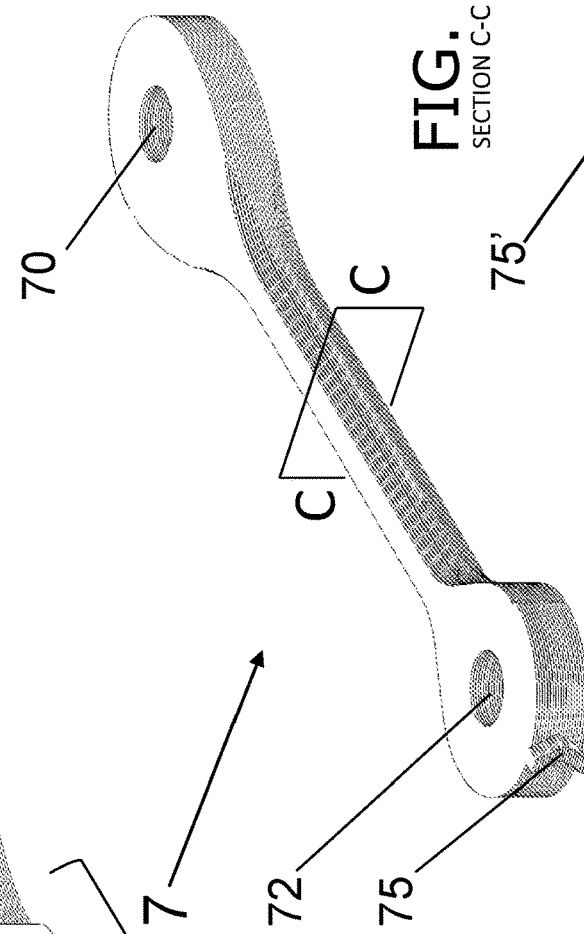
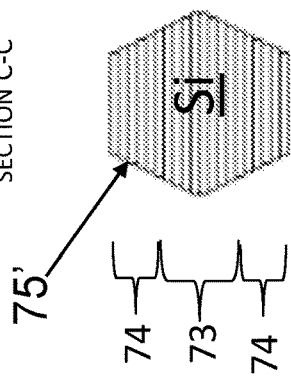

TENSION TORSION STRAP OF A ROTOR HEAD OF A ROTARY WING AIRCRAFT

CROSS REFERENCE TO RELATED APPLICATIONS

This application is an US national phase of PCT/EP2021/060689, filed Apr. 23, 2021, which claims priority to Swiss patent application 00539/20, filed on May 6, 2022, the content of both of which is herein incorporated by reference.

BACKGROUND OF THE INVENTION

Field of the Invention

The present invention relates to a tension torsion strap which operates as part of rotor head of a rotary wing aircraft. The tension torsion strap includes, in a direction of a longitudinal axis a first peripheral area with a connection eye, a central section and a second peripheral area with a connection eye. The tension torsion strap may comprise one-piece and be made of a multiplicity of joined layers. The present invention further relates to a rotor head of a rotary wing aircraft, comprising at least a rotor hub, a rotor drive train hub, and a multiplicity of blade holder, wherein the multiplicity of blade holder is fixable with a multiplicity of associated tension torsion straps.

Description of Related Art

Tension torsion straps as part of a rotor head of a rotary wing aircraft are known. The rotor head comprises at least a rotor hub, a rotor drive train hub and a multiplicity of blade holder, wherein the multiplicity of blade holder is fixable with a multiplicity of associated tension torsion straps at the rotor drive train hub. The tension torsion strap or member as part of a rotorcraft counter torque device or rotor head absorbs centrifugal forces during flight operations.

From EP3315403 single tension torsion straps and twistable beams are known, wherein each of the twistable beams is fixed to a blade and to the hub, in particular to absorb the centrifugal forces undergone by the blade. Each tension torsion strap has a sufficiently low torsional stiffness to allow rotation of the blade around its pitch axis. The tension torsion strap is built of layershaving an overall symmetrical shape with identically formed connection eye sections in the peripheral areas as set out in EP3315403.

The tension torsion straps of U.S. Pat. No. 8,834,128 include a layered structure and are generally thicker than other tension torsion straps known in the prior art. Connection eyes or eyelets in the peripheral areas are identically formed and both peripheral areas are congruent, if the peripheral areas were to be folded around a transverse axis. Inclined planes in the peripheral areas are also congruent on both sides so that there is mirror symmetry of the tension torsion strap relative to the longitudinal axis and a transversal axis. Therewith, an overall symmetric shape relatively to a transverse axis, or in other words a rotation symmetry of prior art tension torsion straps, results.

BRIEF SUMMARY OF THE INVENTION

An object of the present invention is to create, for a rotor head of a rotary wing aircraft, an optimized kind of tension torsion strap along with a rotor head of a rotary wing aircraft with a multiplicity of such tension torsion straps, whereby an improved production and installation is sought. A simplified maintenance may follow and optional weak points may become visible before destruction. A more simplified maintenance work of the tension torsion strap of the rotor head may result, thereby leading to a more efficient maintenance of the rotary wing aircraft.

As the manufacturing of the tension torsion straps is optimized and errors are prevented and/or reduced during assembly, a possibility arises to extend maintenance intervals.

An additional result, namely, easier detection of cracks or imminent fractures, time-consuming dismantling of many components may be avoided.

BRIEF DESCRIPTION OF THE SEVERAL VIEWS OF THE DRAWINGS

Further advantages, features, and details of the various embodiments of this disclosure will become apparent from the ensuring description of a preferred exemplary embodiment and with the aid of the drawings. The features and combinations of features recited below in the description, as well as the features and feature combination shown after that in the drawing description or in the drawings alone, may be used not only in the particular combination received, but also in other combinations on their own, without departing from the scope of the disclosure.

A preferred exemplary embodiment of the subject matter of the invention with some additional optional features is described below in conjunction with the attached drawings.

It should be noted that in the figures, which are not always representing different embodiments of the invention, the same parts are provided with the same reference symbols or the same component names.

FIG. 1 depicts an exploded view of a rotor of a rotary wing aircraft with partly deconstructed rotor head and as an example a rotor blade attachment device before attachment at a tension torsion strap;

FIG. 2a depicts an insight view in a rotor head, and more particularly into a rotor hub after removing a hub cap;

FIG. 2b depicts a sectional view A-A of FIG. 2a representing a longitudinal section of an installed tension torsion strap;

FIG. 3a depicts a perspective view of a tension torsion strap;

FIG. 3b depicts a partial section through an edge of a tension torsion strap, here formed of several layers of metallic material with three different layer areas;

FIG. 3c depicts a top view of a tension torsion strap according to FIG. 3a with differing curvatures in peripheral or border areas;

FIG. 4 depicts a perspective view of a tension torsion strap with an index at one peripheral area and a wrapping covering the central section;

FIG. 5a depicts a perspective view of a tension torsion strap with an indexed cross section, here in hexagonal form; and FIG. 5b depicts an indexed cross section along line C-C in more detail and showing a layer-like structure.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that at least one of "A, B, and C" should not be understood as including only one of A, only one of B, only one of C, or any combination of A, B, and C.

Figure 1:
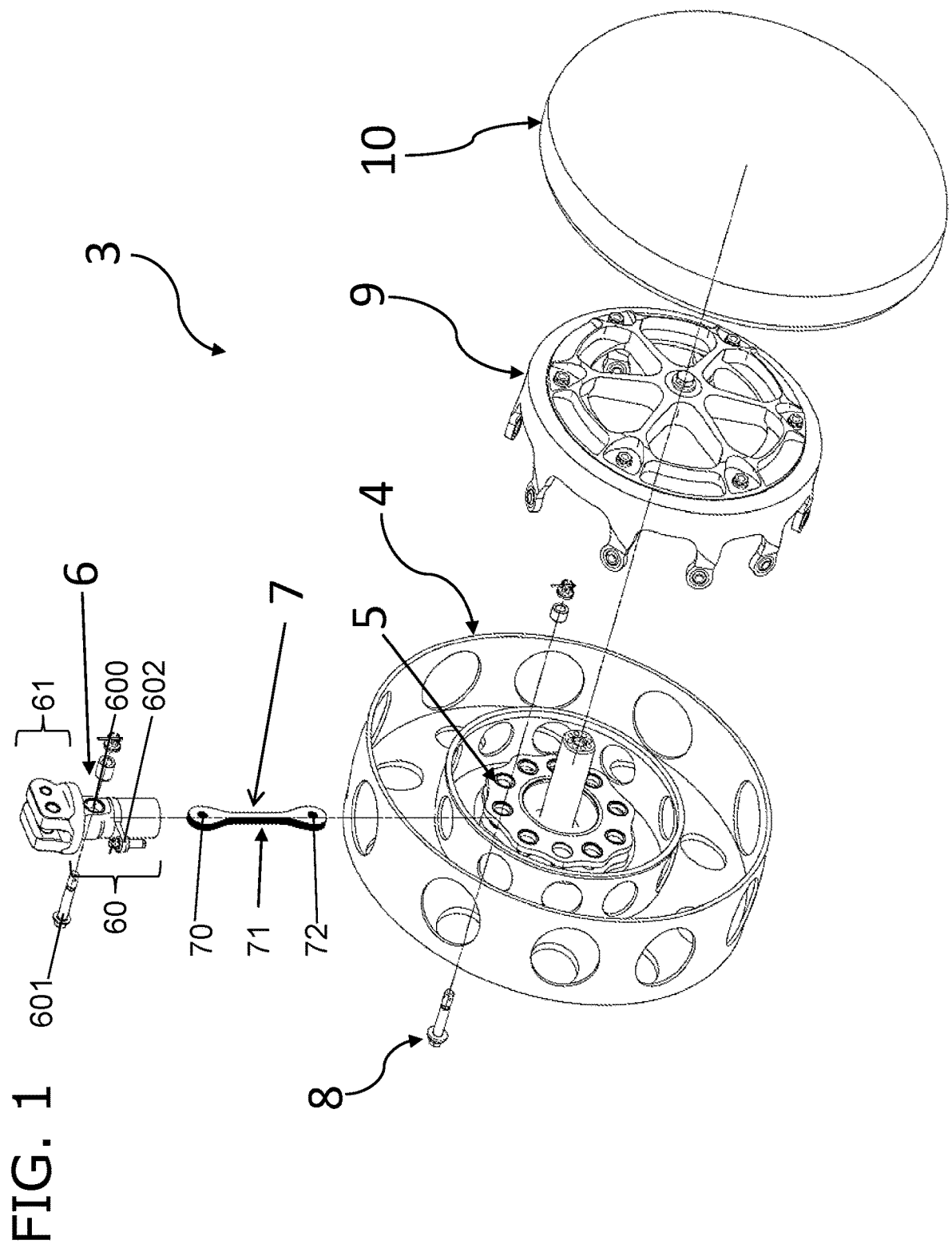

FIG. 1 sets out an example embodiment of the herein described invention. For purposes of clarity and/or ease of understanding, a possible shroud and a multiplicity of rotor blades of the rotor have been omitted. At a rotor drive train, which is connected to a gear box, a rotor head 3 can be connected. The rotor head 3 comprises a rotor hub 4, a rotor drive train hub 5 in the form of a coupling element which is separated from rotor hub 4 or integrated in rotor hub 4, and a multiplicity of blade holder 6 with associated tension torsion straps 7 which are detachably fixed with mounting bolts 8. A pitch control unit 9 is rotatably connected at least to the multiplicity of blade holder 6 and the whole rotor drive train hub 5, and all can be covered with a hub cap 10. The rotor head 3 can be rotated around the dotted central axis.

As depicted, the blade holder 6 comprises two parts, a strap holding part 60 and a blade holding part 61. For purposes of brevity, further description of the blade holding part 61 is herein omitted. Both parts are integrally moulded here. The strap holding part 60 includes a connection bore 600 through which a strap holding bolt 601 can be inserted to hold one side of the tension torsion strap 7. An integrally moulded pitch horn 602 or a fixed pitch horn 602 provides for a coupling to the pitch control unit 9 for every blade holder 6 and indirectly for every rotor blade. When assembled, the blade holder 6 is partly located in holes inside the rotor hub 4. At least the blade holding part 61 of each blade holder 6 protrudes from the holes.

The tension torsion strap 7 essentially includes three sections: a first connection eye 70, a central section 71, and a second connection eye 72. The first connection eye 70 merges into the central section 71 and the central section 71 merges into the second connection eye 72. All sections may be made of planar or flat layers.

With the first connection eye 70, a connection at the blade holder 6 becomes possible. Both components are connected by means of a screw connection or socket pins after the strap holding bolt 601 has been passed through the connection bore 600. Thus, a linearly unchangeable fastening is achieved. When fastened, the tension torsion strap 7 protrudes through openings in the rotor hub 4 up to the rotor drive train hub 5. On the other side, the tension torsion strap 7 is connected to the blade holder 6, and more specifically to the strap holding part 60 mounted inside the circumference of the rotor hub 4. Other design options for and/or of the blade holder 6 may be implemented here, the other designs being appreciated by a person skilled in the art.

With the second connection eye 72 the tension torsion strap 7, a detachable attachment to the rotor drive train hub 5 can be made. For this purpose, corresponding openings are provided in the rotor drive train hub 5, through which the mounting bolt 8 can be pushed, thereby holding the second connection eye 72. Different types of connection, including screw connections or plug connections, are available under the invention. The whole tension torsion strap 7 must have a certain flexibility in order to allow the pitch control unit 9 to deflect the rotor blade with blade holder 6.

Figure 2B:
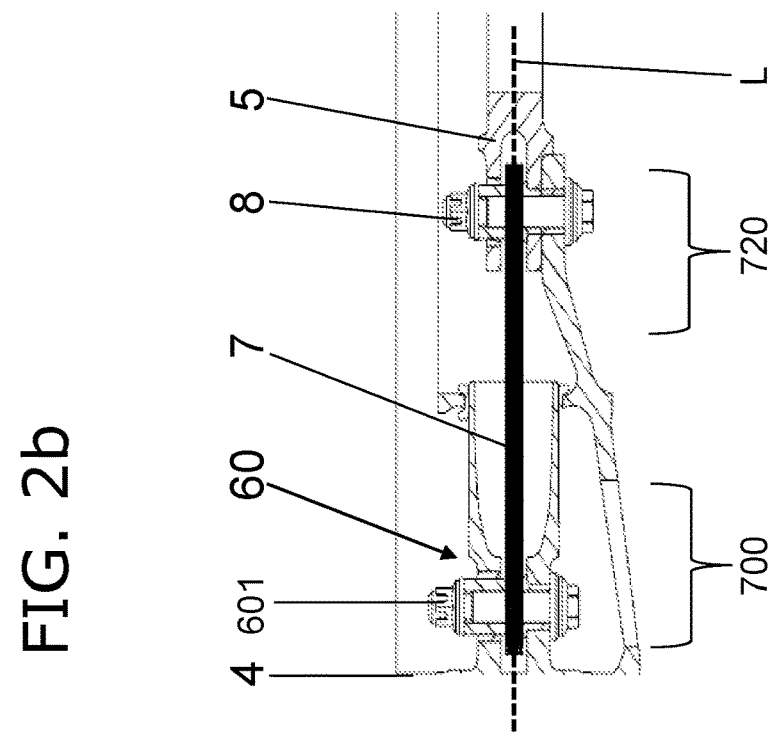
Figure 2A:
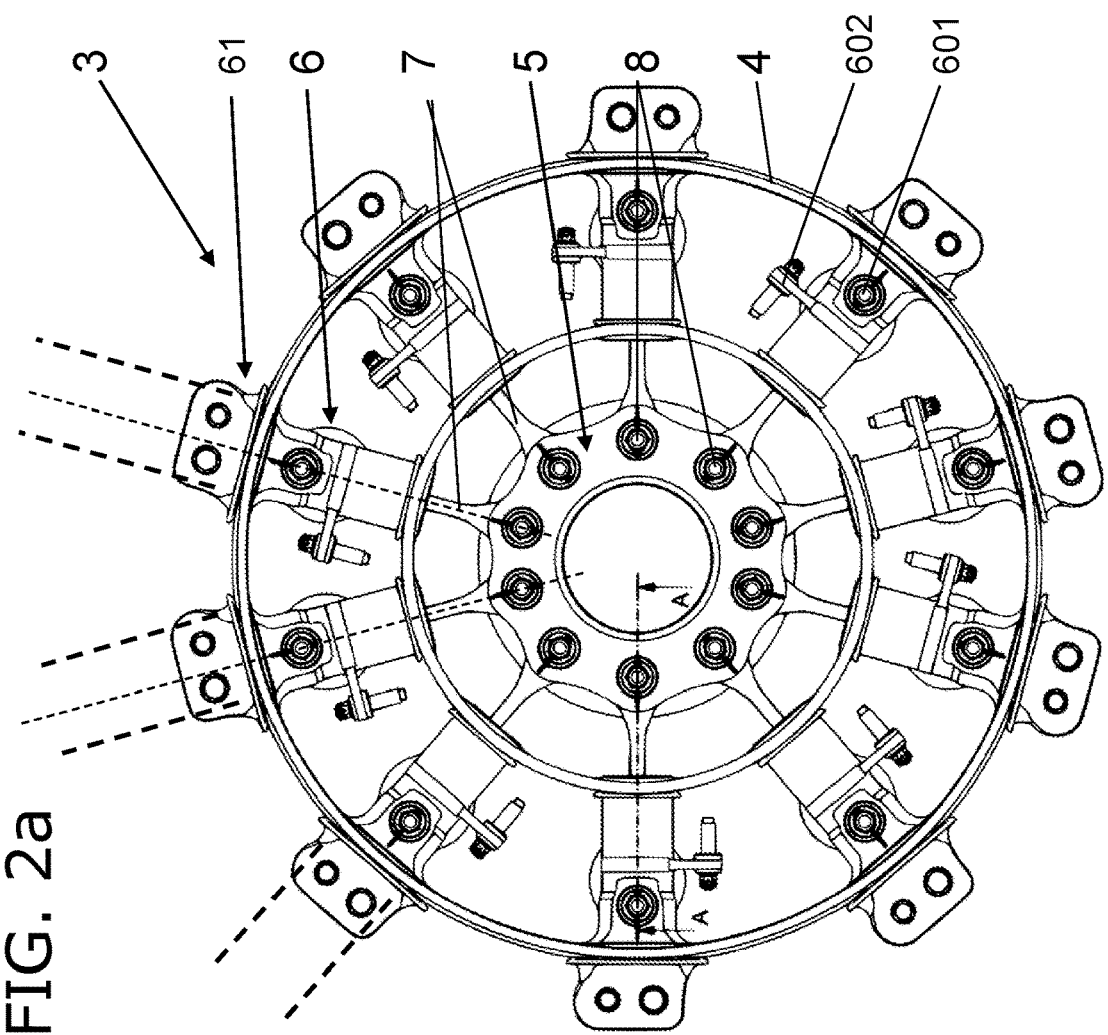

In the rotor head 3 as depicted in FIG. 2a, the multiplicity of tension torsion straps 7, each connected one-sided at the rotor drive train hub 5, reaching through openings in the rotor hub 4, and radially projecting to corresponding blade holders 6, are depicted. At the inner side of the tension torsion straps 7, the mounting bolts 8 are fixed and may be secured by a nut. At the strap holding part 60, the strap holding bolt 601 holds the tension torsion strap 7 inside the blade holder 6. Here, too, a detachable connection by means of a pin connection may be used. After connection of each pitch horn 602 at the pitch control unit 9, each tension torsion strap 7 can be lengthwise pivoted by a minimum angle. Some rotor blades are graphically indicated with dotted lines, wherein, additionally, the longitudinal axis of the tension torsion straps 7 are marked.

A corresponding sectional view through a mounted tension torsion strap 7 is shown in FIG. 2b. The tension torsion strap 7 is clamped and detachably connected between the rotor hub 4 and the rotor drive train hub 5 in a direction of the longitudinal axis L of the tension torsion strap 7. An outside area 700 of the tension torsion strap 7 is connected at the rotor hub 4 and an inside area 720 is connected at the rotor drive train hub 5.

The shape of the tension torsion strap 7 supports advantageous results of the presently described invention.

The tension torsion strap 7 includes along its longitudinal axis L a first connection eye 70 in the outside area 700, a central section 71, and a second connection eye 72 in the inside area 720. The tension torsion strap 7 has a layered structure and comprises at least two kinds of layer areas having different material layer. It is advantageous to use a layered structure to achieve desired torsional properties.

Figures 3A, 3B, 3C:
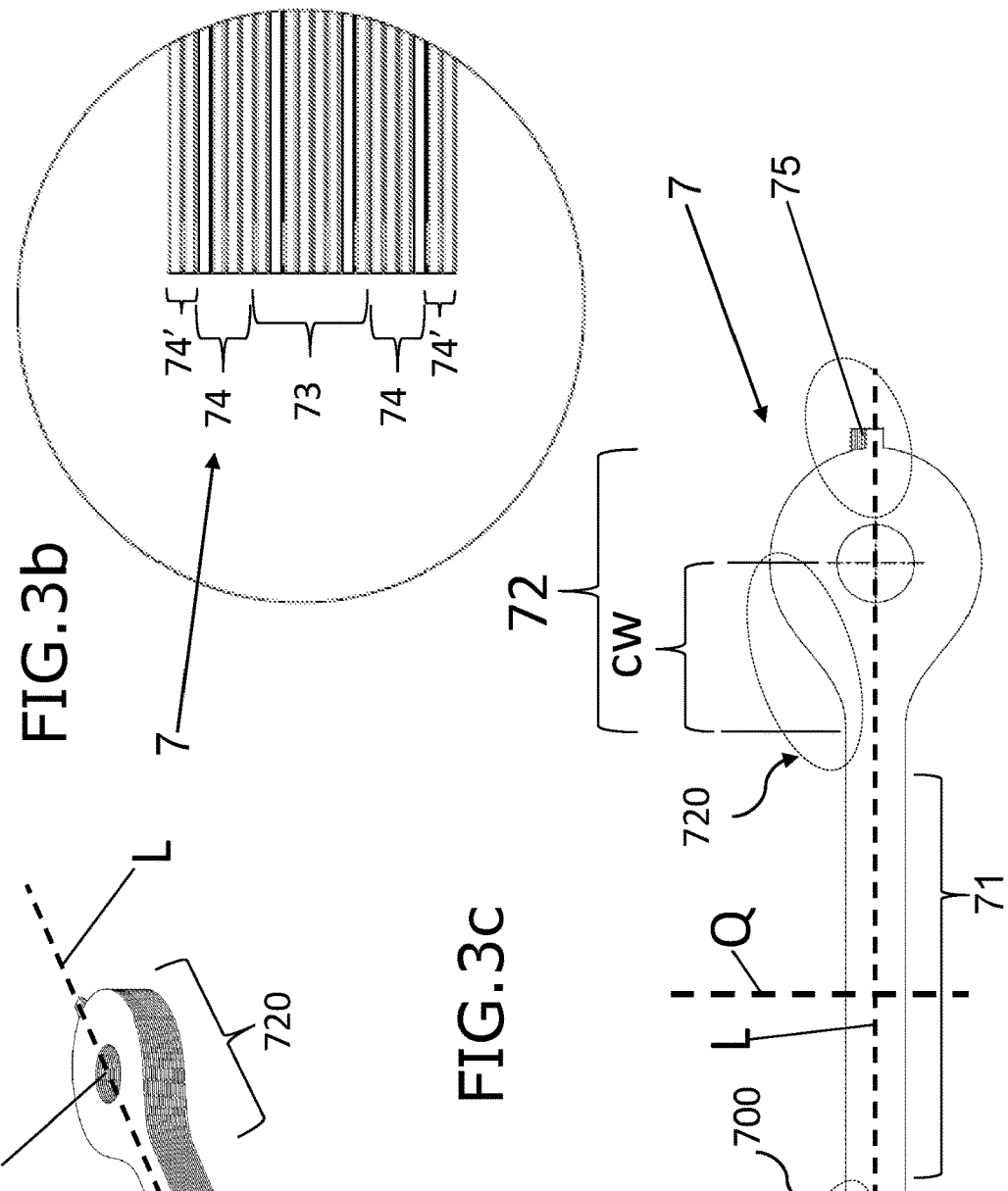

As depicted in FIG. 3a, the overall shape along the longitudinal axis L of the tension torsion strap 7 is asymmetrical. By the asymmetry, a different shape of the peripheral areas 700, 720, or a non-concurrent design of the peripheral areas 700, 720 is meant. The degree of asymmetry must be so great that the differences in the peripheral areas 700, 720 are correspondingly visible to the naked eye.

With such an asymmetrical tension torsion strap 7, an indication of the correct orientation for installation may be reached and determined with the naked eye. Beside this visual help, the asymmetric shape is adapted to their counterparts, thus making it impossible to install the part incorrectly. Therewith, an essentially failure proof system is obtained.

Such asymmetry, especially in the peripheral areas, can additionally lead to peripheral areas with different properties. Here the outside area 700 is a stronger section in terms of strength than the inside area and weaker section 720. If a weaker section 720 is reached as part of the tension torsion strap 7, this end will first show signs of fatigue failure. This makes inspection easier because only the weaker section 720 need be checked. Therefore, associated cut-outs should be placed in a blade pitch control spider or rotor drive train hub 5 or a cover of the rotor head 3.

The typical layer structure arrangement for tension torsion straps 7 is depicted in FIG. 3b. As tests have shown, preferable metallic sheets of a first material or different metals are used, which could be alternately provided or fixed with plastic layers. The use of several materials in different layers 73, 74, 74' results in structures that have as low as possible torsional stiffness while still maintaining sufficient strength in axial tension. A result in using multiple materials is less stiffness in torsion than when using a single material. Preferred results may be reached when using different metals/plastics compounds in a first layer area 73, a second layer area 74 and a third layer area 74'. Especially when these different layers 73, 74, 74' are alternately arranged as shown in FIG. 3b, minimum torsional stiffness can be achieved. An alternated arrangement of at least two different layer areas 73, 74 may also produce preferred results. Some layers may comprise plastics and than favourably reinforced by fibres. However, they are single layers and not a complete strap in one. Accordingly, they can be cut from a 2D plate thereby easing certain manufacturing requirements.

As depicted in FIG. 3c, the asymmetry of the tension torsion strap 7, and in particular peripheral areas 700, 720, can be achieved by different curvature forms. The outside area 700 includes a curvature of stronger section cs, while the inside area 720 includes a curvature of weaker section cw. The curvature cs in the outside area 700 in a longitudinal direction away from the longitudinal axis L is significantly less than in the inside area 720. Accordingly, the shape of the first eyelet 70 is larger in longitudinal direction than the shape of the second eyelet 72. Both eyelets 70, 72 are easy to distinguish from each other and the alignment of such tension torsion strap 7 can easily be done correctly. The individual used layers of the tension torsion strap 7 must be adapted to the overall asymmetry of the tension torsion strap 7 to be achieved.

Another feature to ensure the correct arrangement of the tension torsion strap 7 during manufacturing and during placement between rotor hub 4 and rotor drive train hub 5 is the arrangement of an index 75. With the index 75, at at least one peripheral area 700, 720, an asymmetrical tension torsion strap 7 with asymmetrical peripheral areas 700, 720 can also be achieved.

Such index 75 can be located on one of the end faces or side faces, in the area of the outer area 700 or the inside area 720. In this case the index 75 is preferably located in the area of the inside area 720, protruding from the outer face of the inside area 720 and protruding away from the side face of the inside area 720 in longitudinal direction L.

Accordingly, even only with the index 75, an overall asymmetry of the whole tension torsion strap 7 described above can be reached.

For visibility of the correct preassembly of the tension torsion strap 7, the index 75, for example, formed as an arrow as depicted here, is added on one side of the tension torsion strap 7. The arrow 75 protrudes from the outer surface of a peripheral area 700, 720, here at the side of the second connection eye 72, indicating a direction with its arrowhead.

Due to asymmetry of the tension torsion strap 7 reached by means here described, with or without an index 75 at the tension torsion strap 7, a wrong installation of the whole tension torsion strap 7 in the rotor head 3, respectively in the rotor hub 4 and/or the rotor drive train hub 5, can be prevented.

Here it is essential to allow the stronger section 700 and the weaker section 720 to be at the correct position. Therefore, the tension torsion strap 7 surrounding parts in the rotor head 3 are designed in such a way that a protruding index 75 or another form of an index 75', as described below, would collide with them. This disables the possibility of installing the tension torsion strap 7 in the rotor head 3 in the wrong way.

To improve the torsional behaviour the different layers 73, 74, 74' can be of different shape and material.

The asymmetric tension torsion strap 7 is asymmetrical relatively to a transverse axis Q with two unequally shaped peripheral areas 700, 720. These peripheral areas 700, 720 cannot be brought into alignment when folding around the transverse axis Q.

A main intention of an asymmetric tension torsion strap 7, with or without an index 75 is to make it impossible to install the part incorrectly. For higher stability of the asymmetric tension torsion strap 7 with or without an index 75, a wrapping 76 is used and wrapped around the central section 71. Such wrapping 76 is a synthetic piece, preferably made of a transparent or translucent elastomer. Preferably the wrapping 76 is designed to be endless or hose-like. The wrapping should be at least partly in direct contact with the outer surface of the central section 71.

Possible elastomers or polymers for the wrapping 76 are sufficiently flexible polymers, in particular in a form of a heat shrinking tube. Preferred is a wrapping 76 of a very soft material in order not to provide additional unintended stiffness or to attract stress injection, the material including a moulded elastomer such as silicone.

The wrapping 76 is tightly wrapped and linearly immovably arranged. The wrapping 76 could be attached via heat shrinking and surrounding all layers 73, 74, 74' in the central section 71 of the tension torsion strap 7.

In the perspective view of a tension torsion strap 7 according to FIG. 5a, the layer-like structure can be easily recognized. Beside improving absorption of the centrifugal forces and still providing sufficient torsional properties, the layer-like structure can be used as index 75'.

Here as an index 75' an indexed cross section Si of the tension torsion strap 7 is used, adjacent layers have different shapes or different layer outlines and are designed in such a way as to create a prescribed shape while visualizing correct assembly of the tension torsion strap 7 in the rotor head 3. The indexed cross section Si includes a hexagonal shape with a multiplicity of layers 73, 74, with different layer outlines. Direct neighbouring layers include different layer outlines, leading to the overall hexagonal index cross section Si. The correct assembly of the tension torsion strap 7 is easy to recognize because an incorrect sequence of the individual layer 73, 74 arrangement can be read off directly.

The indexing along with the index cross section Si of the tension torsion strap 7 can correspond to the shape of surrounding parts like rotor hub 4, rotor drive train hub 5 and/or blade holder 6. The cross-section Si is formed so as to optimize torsional stiffness and drive the stress in the tension torsion strap 7.

The index cross section Si may comprise shapes other than hexagonal shapes, such shapes including polygons, star polygons, and in particular regular polygons, each being built with direct neighbouring layers with different shapes.

As indicated in FIG. 5b, the layers 73, 74 could also comprise groups of layers with different materials and/or shapes, here at least two groups of different shapes and materials in the layers 73, 74, may be used for strength and stiffness tuning. While this has so far been done by the shape of the different layers, here an additional tuning method by selecting different materials is added.

The material of the inner layers 73 in the cross-section Si is in particular stiffer or more rigid than the material used of the outer layers 74. Additionally, the wear behaviour between the layers may be improved with the different materials.

In general, the tension torsion strap 7 needs no attachment of additional or external components at the body of the tension torsion strap 7 and in particular the joined layers 73, 74, 74', in order to reach an overall asymmetric body. Accordingly, no components can be attached in the wrong way or can fall off unwantedly.

All the tension torsion straps 7 according to the invention can be described as one piece of a layered structure. The shaping of the tension torsion strap 7 and in particular of the shapes of each layer 73, 74, 74', results in certain technical advantage and solves certain problems. Due to the shaping the herein described tension torsion straps 7, a rotation symmetry to the transverse axis is avoided.

Since the devices and methods described in detail above are examples of embodiments, they can be modified to a wide extent by the skilled person in the usual manner without departing from the scope of the invention. In particular, the mechanical arrangements and the proportions of the individual elements with respect to each other are merely exemplary. Some preferred embodiments of the apparatus according to the invention have been disclosed above. The invention is not limited to the solutions explained above, but the innovative solutions can be applied in different ways within the limits set out by the claims.

The invention claimed is:

1. A tension torsion strap as part of rotor head of a rotary wing aircraft, the tension torsion strap having a body and comprising:
   a first peripheral area arranged in a direction of a longitudinal axis comprising a connection eye, a central section and a second peripheral area with a connection eye,
   wherein the tension torsion strap comprises a multiplicity of joined layers,
   wherein the tension torsion strap comprises, without attachment of additional components at least one of the body and the joined layers, an asymmetric shape relatively to a transverse axis due to two unequally shaped peripheral areas configured to remain out of alignment when folded around the transverse axis, and
   wherein the tension torsion strap further comprises an index attached at one of the peripheral areas, the index configured to form the overall asymmetric shape.

2. The tension torsion strap according to claim 1, wherein:
   each of the peripheral areas comprises different formed curvatures between the central section and the peripheral areas, and
   one of the curvatures, in the outside peripheral area and in longitudinal direction away from the longitudinal axis is less than another curvature in the inside peripheral area.

3. The tension torsion strap according to claim 2, further comprising an index attached at one of the peripheral areas, the index configured to form the asymmetric shape.

4. The tension torsion strap according to claim 1, wherein the joined layers are configured to form asymmetrically formed peripheral areas with or without the index.

5. The tension torsion strap according to claim 1, wherein the index comprises an arrow shape having an arrowhead protruding from the outer or side surface of a peripheral area and indicating a direction with the arrowhead.

6. The tension torsion strap according to claim 5, wherein at least the central section comprises a polygonal index cross section of neighbouring joined layers having different shapes.

7. The tension torsion strap according to claim 1, wherein at least the central section comprises a polygonal index cross section of neighbouring joined layers having different shapes.

8. The tension torsion strap according to claim 7, wherein the index cross section at least partly comprises a at least one of a hexagonal shape, a regular polygon shape, and a star polygon shape.

9. The tension torsion strap according to claim 8, wherein the joined layers comprise different groups of layers comprising at least one of different shapes, different materials and different properties.

10. The tension torsion strap according to claim 9, wherein at least two groups of the different layers comprise at least one of different shapes and materials, the layers forming an index cross section in the central section.

11. The tension torsion strap according to claim 1, wherein the joined layers comprise different groups of layers comprising at least one of different shapes, different materials and different properties.

12. The tension torsion strap according to claim 11, wherein at least two groups of the different layers comprise at least one of different shapes and materials, the layers forming an index cross section in the central section.

13. The tension torsion strap according to claim 1, further comprising a wrapping arranged to cover the central section, the wrapping made of a synthetic material and having a hose-like shape in contact with an outer surface of the central section.

14. The tension torsion strap according to claim 13, wherein the wrapping comprises an elastomer.

15. The tension torsion strap according to claim 13, wherein the wrapping comprises a transparent polymer or a translucent polymer.

16. The tension torsion strap according to claim 1, wherein the joined layers are configured to form asymmetrically formed peripheral areas with or without an index.

17. The tension torsion strap according to claim 1, further comprising an index having an arrow shape and an arrowhead protruding from an outer or a side surface of a peripheral area and indicating a direction with the arrowhead.

18. The tension torsion strap according to claim 1, further comprising a wrapping arranged to cover the central section, the wrapping made of a synthetic material and having a hose-like shape in contact with an outer surface of the central section.

19. A rotor head of a rotary wing aircraft, comprising:
   a rotor hub comprising through holes,
   a rotor drive train hub, and
   a multiplicity of blade holder,
   a plurality of tension torsion straps having a body and comprising a first peripheral area arranged in direction of a longitudinal axis comprising a connection eye, a central section and a second peripheral area with a connection eye, wherein at least one of the plurality of tension torsion straps comprises a multiplicity of joined layers, and wherein the at least one of the plurality of tension torsion straps comprises, without attachment of additional components at at least one of the body and the joined layers, an asymmetric shape relatively to a transverse axis due to two unequally shaped peripheral areas configured to remain out of alignment when folded around the transverse axis, wherein the at least one of the plurality of tension torsion straps further comprises an index attached at one of the peripheral areas, the index configured to form the overall asymmetric shape, and
   wherein the blade holder is configured to be affixed to the plurality of tension torsion straps at the rotor drive train hub when the plurality of tension torsion straps protrude through the through-holes.

* * * * *